United States Patent [19]

Sugioka et al.

[11] Patent Number: 4,561,510
[45] Date of Patent: Dec. 31, 1985

[54] DISPERSING SUPPLY APPARATUS IN AUTOMATIC WEIGHING SYSTEM

[75] Inventors: Yukio Sugioka, Shiga; Masami Kono, Kyoto, both of Japan

[73] Assignee: Kabushiki Kaisha Ishida Koki-Seisakusho, Kyoto, Japan

[21] Appl. No.: 572,316

[22] Filed: Jan. 20, 1984

[30] Foreign Application Priority Data

Jan. 20, 1983 [JP] Japan ............................ 58-007155[U]

[51] Int. Cl.⁴ ...................... G01G 13/22; G01G 19/22
[52] U.S. Cl. ...................................... 177/84; 177/25; 198/445; 198/504
[58] Field of Search ....................... 177/25, 58, 83–88, 177/DIG. 12; 198/445, 504, 533; 414/300, 301, 305, 306

[56] References Cited

U.S. PATENT DOCUMENTS 2,603,442 7/1952 Snyder et al. ..................... 177/58 X
4,344,492 8/1982 Hirano .................................. 177/25
4,362,460 12/1982 Peddinghaus ................... 198/455 X
4,398,612 8/1983 Mikami et al. ..................... 177/58 X

FOREIGN PATENT DOCUMENTS 70647 1/1983 European Pat. Off. ............ 198/504
0074813 3/1983 European Pat. Off. .
2818253 10/1979 Fed. Rep. of Germany ...... 414/305
2074329 10/1981 United Kingdom .
2100449 12/1982 United Kingdom .

Primary Examiner—E. A. Goldberg
Assistant Examiner—Patrick W. Foster
Attorney, Agent, or Firm—Staas & Halsey

[57] ABSTRACT

A dispersing supply apparatus for use in an automatic weighing system includes a dispersing table which receives articles that drop from supply means. Means are provided for simultaneously subjecting the dispersing table to both rotation and reciprocating vertical motion to rotate the articles and oscillate them up and down, thereby preventing the articles from becoming entangled and assuring that the articles will be dispersed outwardly of the table in a uniform manner by centrifugal force.

7 Claims, 7 Drawing Figures

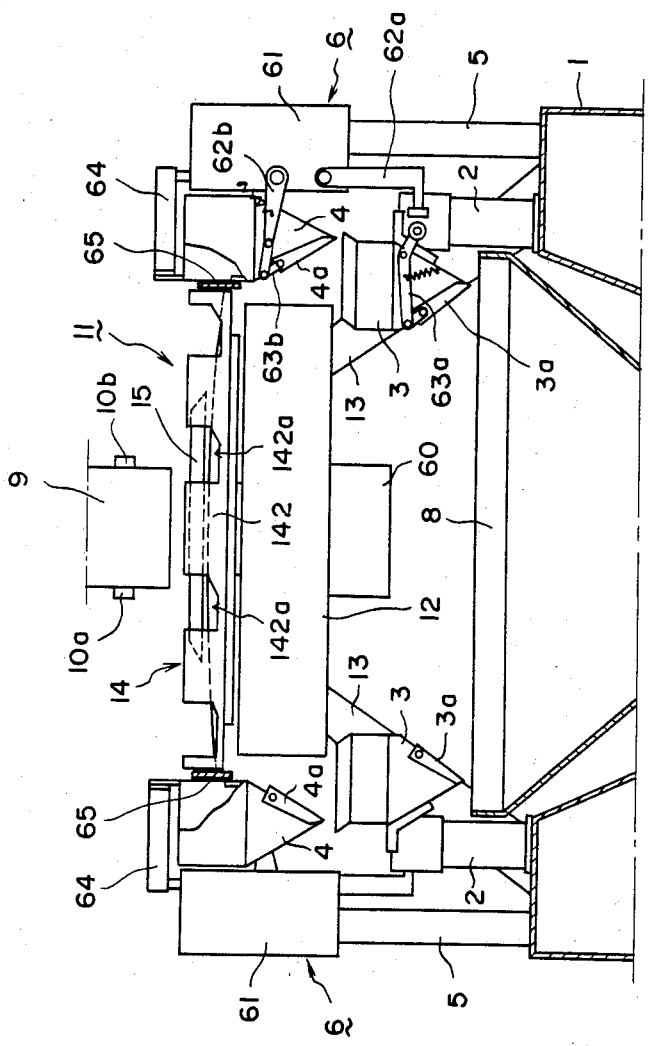

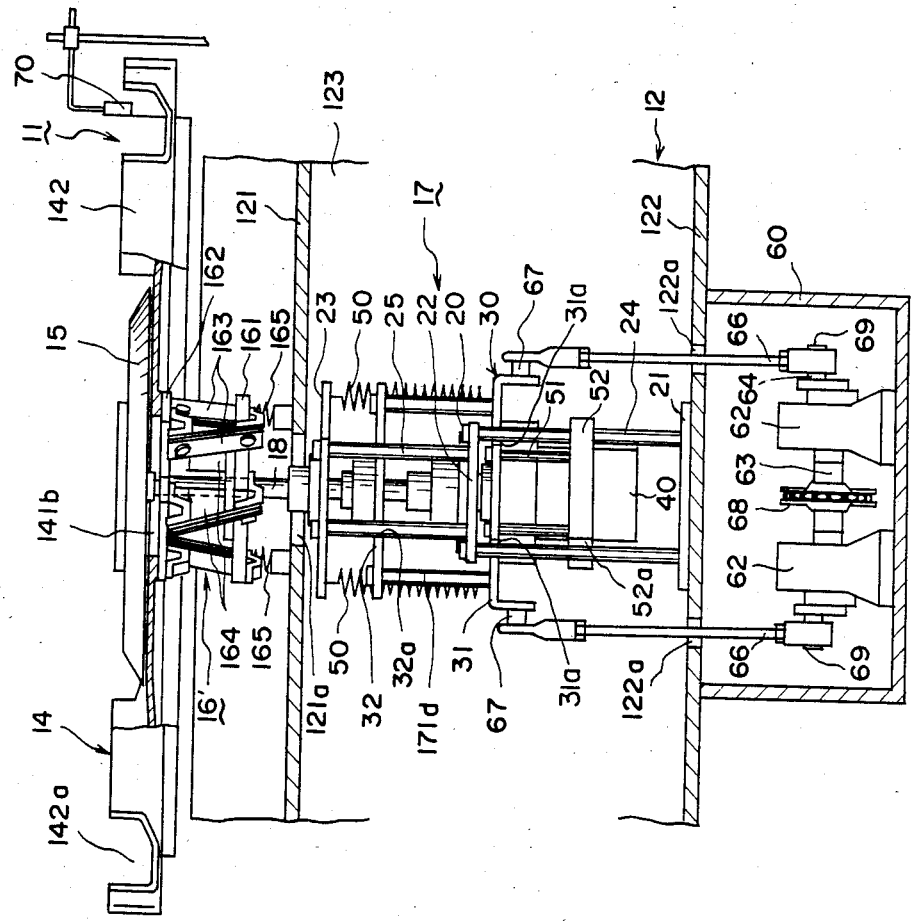

DISPERSING SUPPLY APPARATUS IN AUTOMATIC WEIGHING SYSTEM

BACKGROUND OF THE INVENTION

This invention relates to an apparatus for supplying articles dispersively in an automatic weighing system of the combinatorial weighing type.

A conventional automatic weighing system is composed of a plurality of weighing machines arrayed in a circle. In carrying out a weighing operation with such a system, the weighing machines are supplied with articles to be weighed and combinations of weight values obtained from each of the weighing machines, as well as the total weight of each combination are computed. A combination, are computed whose total weight is equal or closest to a target weight is selected from among the available combinations, and only the articles in the weighing machines corresponding to the selected combination are discharged from these weighing machines, so that a batch of articles the weight of which is equal or closest to the target weight is obtained.

In an automatic weighing system of this type, the articles, which fall from a conveyor, are supplied dispersively into weighing hoppers associated with respective ones of a plurality of weighing machines, or into a plurality of pool hoppers overlying respective weighing hoppers. Accordingly, an apparatus for effecting such dispersive supply must be disposed at the center of the circularly arrayed hoppers.

A conventional dispersing supply apparatus is provided with a dispersing bowl the circumferential wall portion of the dispersing bowl having discharge ports at positions corresponding to the plurality of circularly arranged weighing hoppers or pool hoppers, and a dispersing table disposed at the upper part of the dispersing bowl at the center of the dispersing bowl for receiving the articles which fall from the conveyor. In the operation of this dispersing apparatus, the dispersing table is rotated to disperse the articles radially outward by centrifugal force and, hence, distribute them on the dispersing bowl. The dispersing bowl is vibrated to transfer the articles to the circumferential wall portion of the dispersing bowl, where the discharge ports are provided.

However, the foregoing dispersing supply apparatus is defective in that certain articles are difficult to dispersively supply in uniform and stable manner. For example, articles that become easily entwined, such such as articles that are long, slender and soft, cannot be uniformly dispersed. As a result, some of the weighing hoppers or pool hoppers are supplied with an excessive amount of the articles in an entangled mass, while others receive too little of the articles.

SUMMARY OF THE INVENTION

An object of the present invention is to provide a dispersing supply apparatus in an automatic weighing system of the type in which articles, which fall onto a centrally located portion of the apparatus, are dispersively supplied to a plurality of weighing hoppers or pool hoppers arrayed in a circle surrounding the apparatus so that articles which are entangled with one another upon dropping onto the dispersing supply apparatus are unraveled and dispersed in uniform fashion so that the hoppers are supplied with approximately constant amounts of the articles.

Another object of the present invention is to provide a dispersing supply apparatus capable of transferring articles smoothly toward discharge ports provided at positions corresponding to the hoppers.

A further object of the present invention is to provide a dispersing supply apparatus capable of dispersing articles uniformly without the articles piling up near the discharge ports.

According to the present invention, the foregoing objects are attained by providing a dispersing supply apparatus for use in an automatic weighing system of the type in which articles, which fall onto a centrally located portion of the apparatus, are dispersively supplied to a plurality of weighing hoppers or pool hoppers arrayed in a circle surrounding the apparatus, which apparatus includes a platform supported by a base of the automatic weighing system, a dispersing bowl supported by the platform and having a circumferential wall portion which is provided with a plurality of discharge ports at positions corresponding to the hoppers, a vibrating unit disposed on the platform and supporting the dispersing bowl, a dispersing table disposed on the central portion of the dispersing bowl on the upper side of the dispersing bowl, a drive unit disposed on the platform for rotating the dispersing table and moving the dispersing table up and down, a plurality of shutters disposed between respective ones of the hoppers and the discharge portions of the dispersing bowl, and means for opening and closing and shutters.

Other features and advantages of the present invention will be apparent from the following description taken in conjunction with the accompanying drawings, in which like reference characters designate the same or similar parts throughout the figures.

BRIEF DESCRIPTION OF THE DRAWINGS

FIG. 1 is a schematic view illustrating an automatic weighing system equipped with a dispersing supply apparatus according to the present invention;

FIG. 3 is an enlarged front view of a dispersing supply apparatus according to the present invention;

DESCRIPTION OF THE PREFERRED EMBODIMENT

Figure 6:
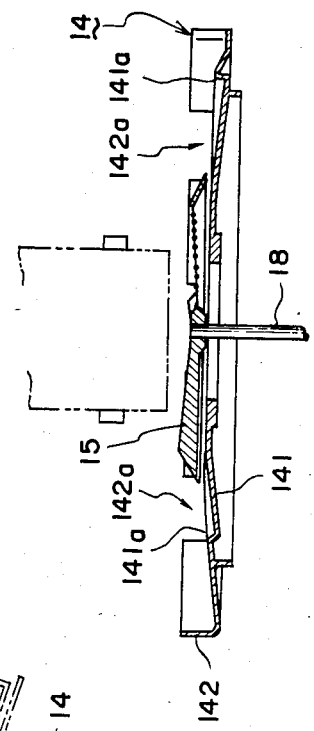
FIG. 6 is a sectional view taken along line VI—VI of FIG. 2.

With reference to FIG. 1, numeral 1 denotes a base on which a plurality of weight senors 2 . . . 2 are disposed in a circular array. Weighing hoppers 3 . . . 3 are attached to respective ones of the weight sensors 2 . . . 2. Each combined weighing hopper and weight sensor constitute a weighing machine. A plurality of pool hoppers 4 . . . 4, disposed above respective ones of the weighing hoppers 3 . . . 3, are supported via respective opening devices 6 . . . 6 attached to corresponding support posts 5 . . . 5 erected on the base 1. Each opening device 6 comprises a drive unit 61 housing a drive mechanism attached to a support post 5, pivoting members 62a, 62b actuated by the drive unit 61, link mechanisms 63a, 63b for transmitting the motion of the pivoting members 62a, 62b to gates 3a, 4a of the corresponding weighing hopper 3 and pool hopper 4, to open and close the gates, and an elevating member 64 for actuating a respective shutter 65 provided at an inlet of the corresponding pool hopper 4.

Numeral 8 denotes a collecting chute disposed below the weighing hoppers 3 . . . 3 for delivering articles to a packaging apparatus (not shown) upon collecting the articles released from the weighing hoppers. Attached to a supply conveyor (not shown) above the collecting chute 8 is a chute 9 for dropping the articles. Mounted on the dropping chute 9 is a sensor comprising a light-emitting element 10a and a light-receiving element 10b. The sensor is adapted to issue a signal which stops the operation of the supply conveyor when articles in excess of a prescribed amount pile up on a dispersing table 15 of a dispersing supply apparatus 11.

The dispersing supply apparatus 11 is disposed between the collecting chute 8 and dropping chute 9 and includes a platform 12 fixedly supported on a plurality of support legs 13 . . . 13 secured to the base 1. With reference to FIGS. 2 through 7 illustrating the dispersing supply apparatus in greater detail; the platform 12 comprises disk-shaped upper and lower plates 121, 122, as well as an annular side plate 123 connecting the upper and lower plates 121, 122, as best shown in FIG. 3. The lower plate 122 is fixedly secured to the upper ends of the support legs 13 . . . 13. The dispersing supply apparatus 11 includes a dispersing bowl 14 and the above-mentioned dispersing table 15 which are disposed on the platform 12, the bowl and table being concentric, and a vibrating unit 16 which supports the dispersing bowl 14 on the upper plate 121 of the platform 12. A drive unit 17 is also provided for rotating the dispersing table 15.

Figure 7:
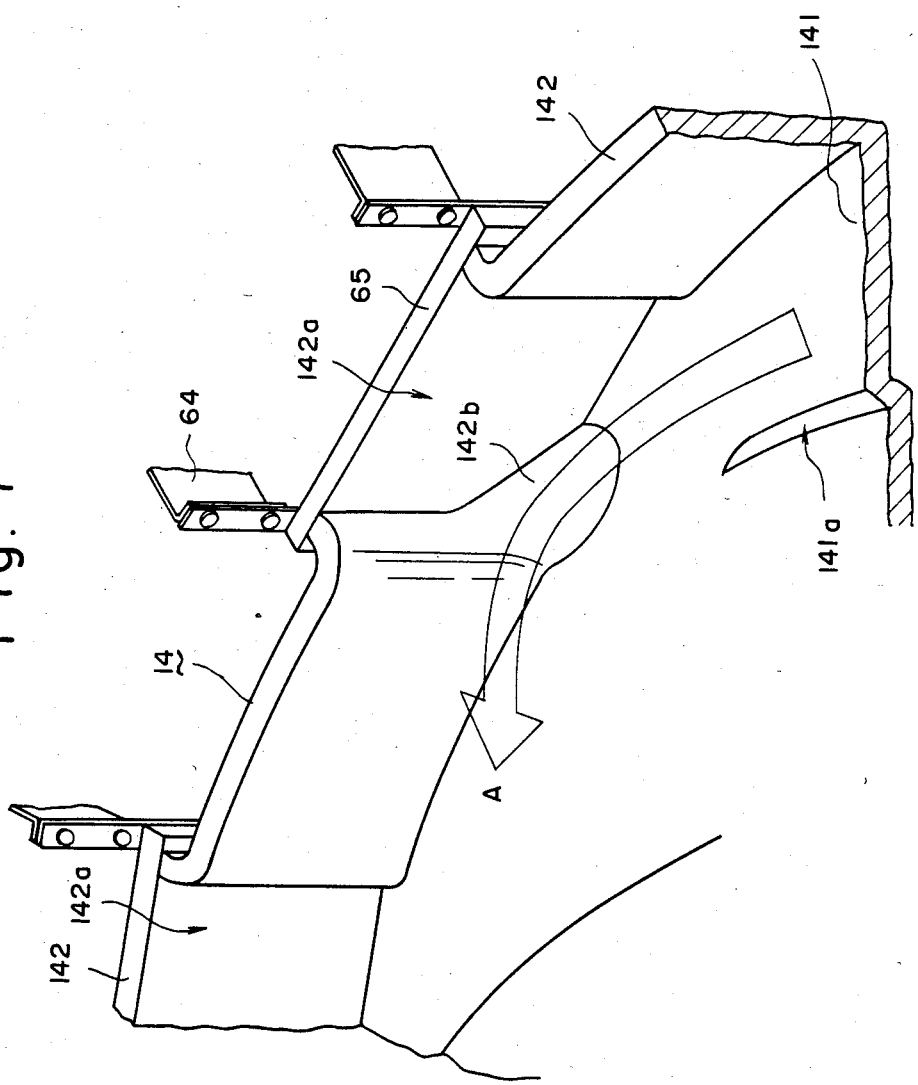
FIG. 7 is an enlarged perspective view showing a dispersing bowl, particularly the region in the vicinity of a discharge port thereof.

As shown in FIG. 7, the dispersing bowl 14 comprises a disk-shaped bottom portion 141 and a circumferential wall portion 142, which is provided with a plurality of discharge ports 142a . . . 142a at positions corresponding to the pool hoppers 12 . . . 12. the floor portion 141 has protuberances 142b . . . 142b (only one of which is illustrated) contiguous to respective corner portions of the discharge ports 142a . . . 142a, the corner portions facing in the direction in which the articles are revolved. When the shutters 65 disposed between the discharge ports 142a and corresponding pool hoppers 12 are closed, the corresponding protuberances 142 prevent articles, which have reached the discharge port 142a, from piling up in the vicinity of the discharge port. More specifically, articles that ride up the inclined surface of the protuberance 142b are forcibly returned toward the interior of the dispersing bowl 14, as indicated by the arrow A, so that the articles may be transferred to the next discharge port.

Figure 2:
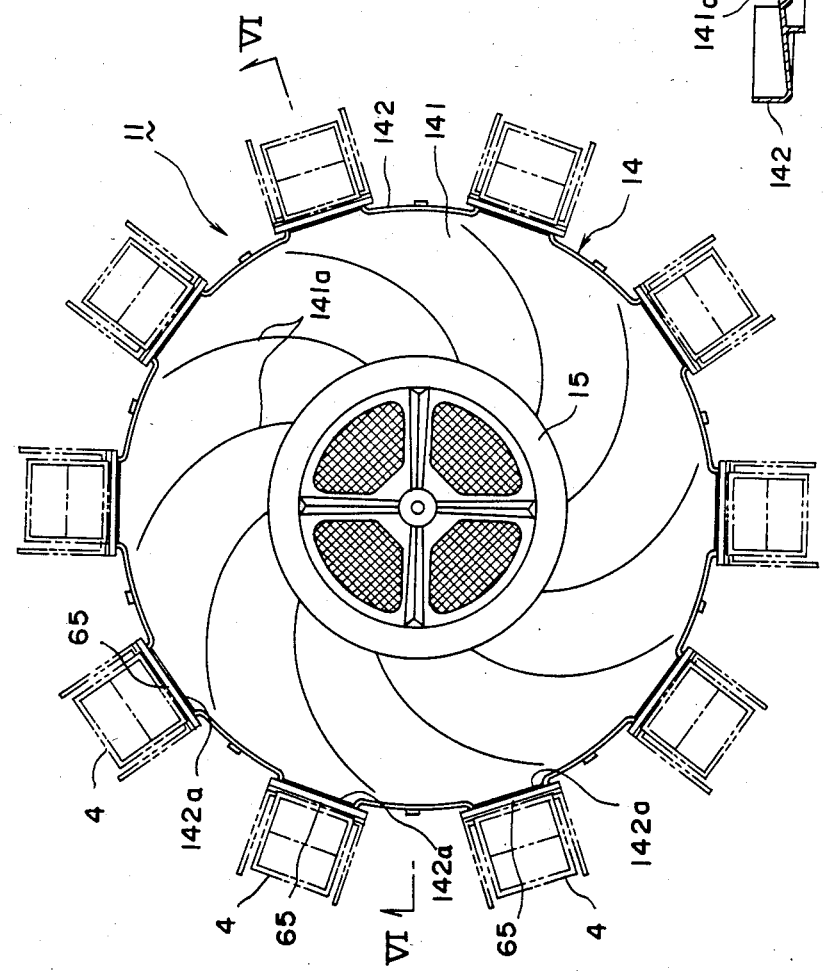
FIG. 2 is a plan view of a dispersing supply apparatus according to the present invention.

As shown in FIGS. 2 and 6, the bottom portion 141 of the dispersing bowl 14 is provided with a stepped floor, the steps 141a . . . 141a of which have a radially outwardly swirling configuration. Owing to the steps 141a . . . 141a, articles are transferred toward the discharge ports 142a in a smooth manner.

The vibrating unit 16, shown in FIG. 3, comprises a base plate 161, a mounting plate 162 on which the dispersing bowl 14 is fixedly supported, a plurality of leaf springs 163 connecting the dispersing bowl mounting plate 162 to the base plate 161, a plurality of electromagnets 164 . . . 164 affixed to the base plate 161, and a plurality of buffering springs 165 . . . 165 supporting the base plate 161 on the upper plate 121 of the platform 12.

The base plate 161 and the dispersing bowl mounting plate 162 are connected, at the periphery thereof, by leaf springs 163 . . . 163 which are inclined in the same direction. With such a construction, the application of a half-wave rectified electric current to the electromagnets 164 . . . 164 causes the dispersing bowl mounting plate 162 to be twisted downwardly against the spring force of the leaf springs 163 . . . 163 owing to the attractive force applied by the electromagnets. However, when a point is reached where the restoring force of the leaf springs 163 . . . 163 surpasses the force produced by the electromagnets 164 . . . 164, the dispersing bowl mounting plate 162 is twisted in the upward direction. As long as the current is applied to the electromagnets, these two forms of motion will continue in alternating fashion, causing the dispersing bowl 14, which is fixedly supported on the mounting plate 162, to undergo helical vibration so that the bowl is twisted upwardly and downwardly in an alternating manner.

The dispersing table 15, which has a disk-shaped configuration, is disposed at the center of the dispersing bowl 14. The dispersing table 15 is mounted on the upper end of a rotary shaft 18 of a drive unit 17 supported by the lower plate 122 of the platform 12. The rotary shaft 18 passes through a hole 141b provided at the center of the dispersing table 14, the vibrating unit 16, and a hole 121a provided in the upper plate 121 of the platform 12.

The drive unit 17 comprises a stationary frame 20 disposed on the lower plate 122 of the platform 12, a movable frame 30 disposed for upward and downward movement with respect to the stationary frame 20, and a first drive motor 40 mounted on the movable frame 30 for rotating the rotary shaft 18. The stationary frame 20 includes a lower stationary plate 21 secured to the upper side of the lower plate 122 of the platform 12, an intermediate stationary plate 22, an upper stationary plate 23, a plurality of connecting rods 24 . . . 24 connecting the lower and intermediate stationary plates 21, 22, and a plurality of connecting rods 25 . . . 25 connecting the intermediate and upper stationary plates 22, 23. The movable frame 30 includes a lower movable plate 31 disposed between the lower and intermediate stationary plates 21, 22 of the stationary frame 20 and having a plurality of holes 31a through which respective ones of the connecting rods 24 are inserted, and an upper movable plate 32 disposed between the upper and intermediate stationary plates 23, 22 and having a plurality of holes 32a through which respective ones of the connecting rods 25 are inserted. The movable frame 30 is supported in a suspended manner by a plurality of springs 50 . . . 50 stretched between the lower movable plate 31 and the upper stationary plate 23 of the stationary frame 20. Attached to the lower movable plate 31 of the movable frame 30 by a plurality of rods 51 . . . 51 are two guide members 52, 52 each of which has recesses 52a, 52a provided in the side portions of the guide members. The arrangement is such that by engaging the recesses 52a, 52a with the connecting rods 24 . . . 24, the movable frame 30 can be moved up and down with respect to the stationary frame 20.

Figure 5:
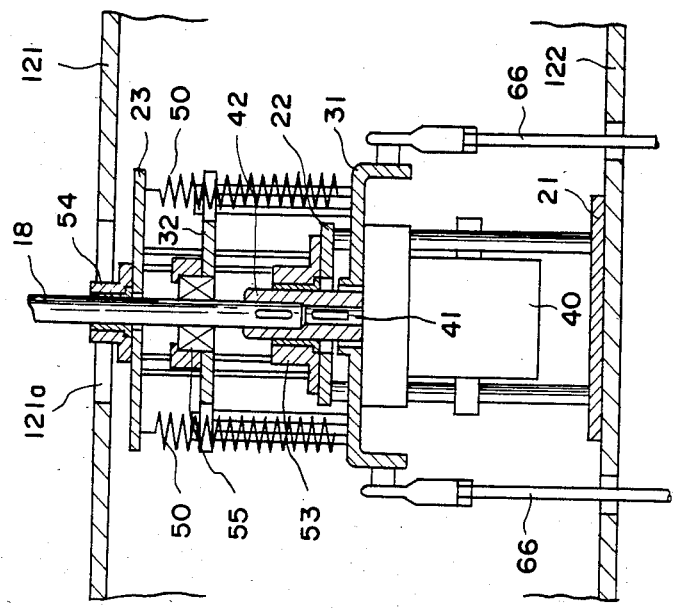
FIG. 5 is a sectional view showing a principal portion of the dispersing supply apparatus according to the present invention.

The first motor 40, which has a drive shaft 41, is fixedly supported on the bottom side of the lower movable plate 31 of movable frame 30. As shown in FIG. 5, the rotary shaft 18 is coupled to the drive shaft 41 of the first motor by a coupling 42. The coupling 42 and rotary shaft 18 are axially supported for both rotational and vertical movement by respective bearings 53, 54 attached to the respective intermediate and upper stationary plates 22, 23 of the stationary frame 20. The rotary shaft 18 is also axially supported for rotational motion by a bearing 55 attached to the upper movable plate 32 of the movable frame 30.

Figure 4:
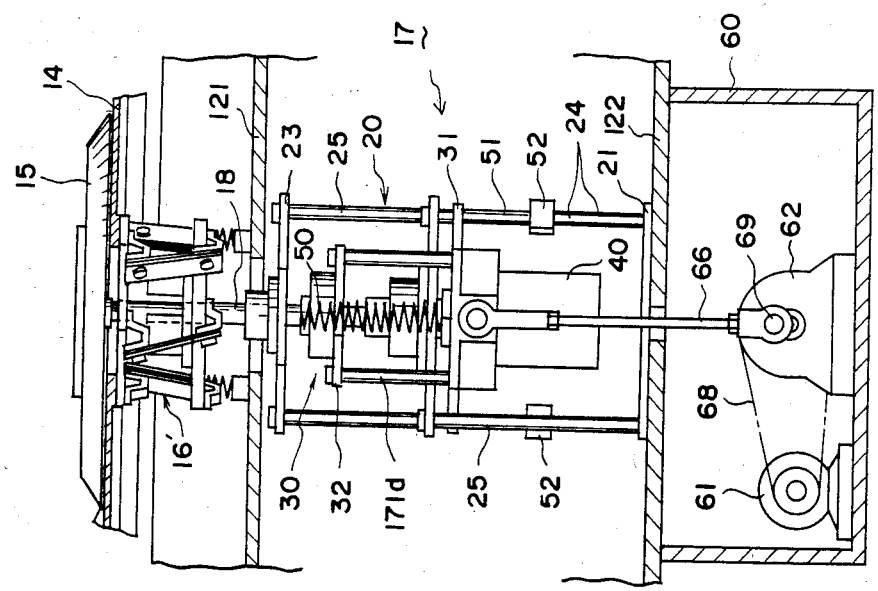
FIG. 4 is a side view of a dispersing supply apparatus according to the present invention.

A drive box 60 is attached to the bottom side of the lower plate 122 of platform 12. Disposed within the drive box 60 are a second motor 61, which is shown in FIG. 4, a drive shaft 63 both ends of which are axially supported by bearings 62, 62, and a chain 68 for transmitting the rotary torque of the second motor 61 to the drive shaft 63, these being shown in FIG. 3. Crank shafts 69, 69 are mounted to the ends of the drive shaft 63. Operating rods 66, 66 are provided having their lower ends rotatably connected to the respective crank shafts 69, 69. The operating rods 66, 66 are passed through respective holes 122a, 122a provided in the lower plate 122 of the platform 12, and have their upper ends rotatably connected to respective pins 67, 67 attached to the lower movable plate 31 of the movable frame 30.

As shown in FIG. 3, the dispersing bowl 14 is provided with a sensor 70 for detecting articles. When articles pile up along the circumferential wall portion 142 of the dispersing bowl 14 in excess of a prescribed amount, the sensor 70 produces a signal in response to which the first and second motors 40, 61 are stopped to halt the operation of the dispersing table 15.

The operation of the dispersing supply apparatus 11 of the present invention will now be described.

When the first motor 40 of the drive unit 17 in the dispersing supply apparatus 11 is set into operation, the dispersing table 15 is rotated via the rotary shaft 18. At the same time, by driving the second motor 61, the drive shaft 63 is rotated via the chain 68, with the rotational force being transmitted to the operating rods 66, 66 through the crank shafts 69, 69 to move the rods 66, 66 up and down. Accordly, the movable frame 30 connected to the operating rods 66, 66 and supporting the first motor 40 and rotary shaft 18 is also moved up and down, so that the dispersing table 15, which is coupled to the rotary shaft 18, is moved up and down while it is being rotated.

When articles to be weighed fall from the supply conveyor onto the dispersing table 15 through the dropping chute 9 while the dispersing table 15 is undergoing the rotational and vertical movement, even articles which are readily entangled because of their long, slender and soft constitution are unraveled by being subjected to the up and down vibration of the vertically reciprocating dispersing table 15. In addition, owing to centrifugal force produced by the rotating dispersing table 15, the articles are dispersed radially outwardly so as to be distributed uniformly within the dispersing bowl 14.

At the same time the first and second motors 40, 61 are being driven, the dispersing bowl 14 is subjected to the above-described helical vibration by the half-wave rectified current fed into the electromagnets 164 of the vibrating unit 16. As a result, the articles delivered to the dispersing bowl 14 from the dispersing table 15 are gradually fed toward the outer circumference of the dispersing bowl 14 by the helical vibration and, hence, to the discharge ports 142a . . . 142a of the circumferential wall portion 142 of the dispersing bowl. At this time, if the shutters 65 . . . 65 disposed on the outer side of the discharge ports 142a . . . 142a are in the open state owing to the action of the opening units 61, the pool hoppers 4 . . . 4 corresponding to the discharge ports 142a . . . 142a will be supplied with the articles from the dispersing bowl 15. The articles thus supplied to the pool hoppers 4 . . . 4 will be provided in approximately fixed amounts since the articles will be untangled and uniformly dispersed owing to the reciprocating vertical motion of the dispersing table 15 and the centrifugal force produced by rotation of the table.

As many apparently widely different embodiments of the present invention can be made without departing from the spirit and scope thereof, it is to be understood that the invention is not limited to the specific embodiments thereof except as defined in the appended claims.

What we claim is:

1. A dispersing supply apparatus, for an automatic weighing system having a base, for dispersively supplying articles to a plurality of hoppers arrayed in a circle surrounding the dispersing supply apparatus, comprising:

a platform supported by the base of the automatic weighing system;

a vibrating unit disposed on said platform;

a dispersing bowl, connected to said vibrating unit so that the dispersing bowl is subject to helical vibration, having an upper side, a central portion and a circumferential wall portion which is provided with a plurality of discharge ports at positions corresponding to the hoppers;

a dispersing table positioned above the central portion of the upper side of said dispersing bowl;

drive means, disposed on said platform, for rotating and vertically oscillating said dispersing table;

a plurality of shutters disposed between respective ones of the hoppers and said discharge ports of said dispersing bowl; and means for opening and closing said shutters.

2. The dispersing supply apparatus according to claim 1, wherein said drive unit comprises;

a stationary frame supported by said platform;

a movable frame supported by said stationary frame in such a manner as to be movable up and down;

a first motor, mounted on said movable frame, for rotating said dispersing table;

a second motor, mounted on said platform, having a shaft; and a crank mechanism rotatably attached to said shaft of said second motor, for transmitting rotational force, produced by said second motor, to said movable frame.

3. The dispersing supply apparatus according to claim 1, wherein said dispersing bowl has a bottom portion provided with steps having a radially outwardly swirling configuration.

4. The dispersing supply apparatus according to claim 1, wherein said dispersing bowl has a bottom portion and protuberances rising from said bottom portion contiguous to respective corner portions of the discharge ports and facing in a direction in which the articles are revolved.

5. The dispersing supply apparatus according to claim 1, wherein said vibrating unit comprises:

a base plate supported on said platform by buffer springs;

a dispersing bowl mounting plate attached to said dispersing table;

a plurality of leaf springs connecting said dispersing bowl mounting plate to said base plate and disposed at an inclination to the vertical direction; and a plurality of electromagnets disposed on said base plate.

6. A dispersing supply apparatus, for an automatic weighing system having a base, for dispersively supplying articles to a plurality of hoppers provided at the periphery of the dispersing supply apparatus, comprising:

a platform provided on the base of the automatic weighing system;

a vibrating unit provided on the platform, including
a base plate resiliently supported on the platform,
a mounting plate,
a plurality of leaf springs resiliently connecting the base plate and the mounting plate, the leaf springs being inclined with respect to a vertical direction, and
a plurality of electromagents disposed on the base plate;

a dispersing bowl, provided on the mounting plate, having an upper surface with a radially outwardly swirling configuration, a central portion and a circumferential wall portion provided with a plurality of discharge ports at positions corresponding to the hoppers;

a dispersing table positioned above the central portion of the dispersing bowl;

a drive unit provided on the platform for rotating and vertically oscillating the dispersing table, including
a stationary frame supported by the platform,
a moveable frame slidably supported by the stationary frame for vertical movement,
a first motor, provided on the moveable frame, for rotating the dispersing table,
a second motor, provided on the platform, having a shaft, and
a crank mechanism, rotatably connected to the shaft of the second motor, for transmitting the rotational force produced by the second motor to the moveable frame so that the moveable frame is vertically oscillated;

a plurality of shutters provided between the discharge ports and respective ones of the hoppers; and means for opening and closing the shutters.

7. A dispersing supply apparatus, for an automatic weighing system having a base, for dispersively supplying articles to a plurality of hoppers provided at the periphery of the dispersing supply apparatus, comprising:

a platform provided on the base of the automatic weighing system;

a vibrating unit disposed on the platform;

a dispersing bowl, connected to the vibrating unit so that the dispersing bowl is subject to helical vibration, the dispersing bowl having a central portion, a circumferential wall portion provided with a plurality of discharge ports at positions corresponding to the hoppers and a plurality of protuberances corresponding to respective ones of the discharge ports, the protuberances facing in a direction in which the articles are revolved in the dispersing bowl and projecting in front of the discharge ports;

a dispersing table positioned above the central portion of the dispersing bowl;

a drive unit provided on the platform for rotating and vertically oscillating the dispersing table;

a plurality of shutters provided between the discharge ports and respective ones of the hoppers; and means for opening and closing the shutters.

* * * * *

UNITED STATES PATENT AND TRADEMARK OFFICE
CERTIFICATE OF CORRECTION

PATENT NO. : 4,561,510
DATED : December 31, 1985
INVENTOR(S) : Sugioka et al.

It is certified that error appears in the above-identified patent and that said Letters Patent is hereby corrected as shown below:

Col. 1, line 15, "are" should be --, are--;
line 16, delete ", are computed";
line 48, delete "such" (second occurrence).

Col. 2, line 28, "and" (second occurrence) should be --the--;
line 57, "senors" should be --sensors--.

Col. 3, line 40, "the" (second occurrence) should be --The--.

Col. 5, line 38, "Accordly," should be --Accordingly--.

Col. 7, line 18, "electromagents" should be --electromagnets--.

Signed and Sealed this

Third Day of June 1986

[SEAL]

Attest:

DONALD J. QUIGG

Attesting Officer

Commissioner of Patents and Trademarks